Figure 1:
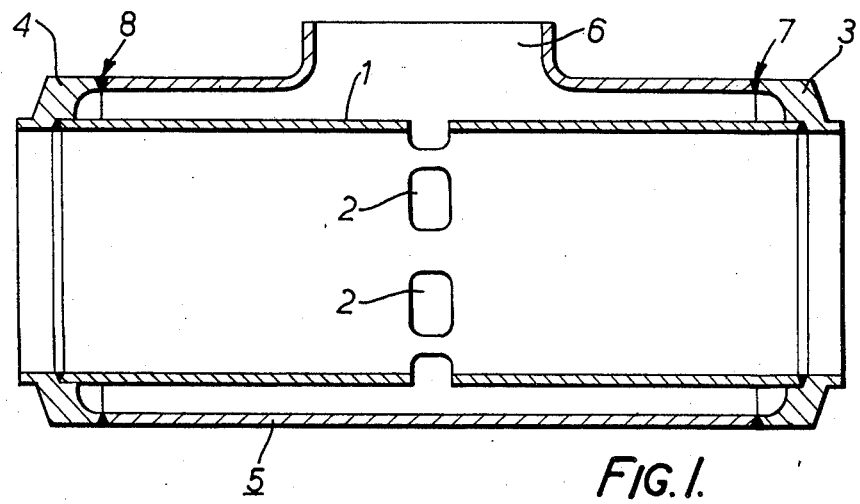

United States Patent [19]

Skinner

[11] 3,986,240
[45] Oct. 19, 1976

[54] METHOD OF MAKING SPHERE-PASSING TEES FOR PIPING SYSTEMS

[75] Inventor: Timothy Hugh Christopher Skinner, London, England

[73] Assignee: Sun Forge Operations Limited, London, England

[22] Filed: Feb. 11, 1975

[21] Appl. No.: 548,993

[30] Foreign Application Priority Data
Feb. 11, 1974 United Kingdom............... 6111/74

[52] U.S. Cl. .......................... 29/157 T; 29/455 R; 29/511; 137/268; 285/156
[51] Int. Cl.² ................. B21D 53/00; B21K 29/00; B23P 15/26
[58] Field of Search ............... 29/455, 511, 157 T; 285/47, 156, 374; 137/268

[56] References Cited
UNITED STATES PATENTS

| 691,454 | 1/1902 | Dies................................ 285/156 X |
| 2,797,704 | 7/1957 | McDermott et al. .......... 29/511 UX |
| 3,511,272 | 5/1970 | Lathrop.......................... 285/156 X |
| 3,524,466 | 8/1970 | Van Scoy........................... 137/268 |

Primary Examiner—Charlie T. Moon
Attorney, Agent, or Firm—Armstrong, Nikaido & Wegner

[57] ABSTRACT

A sphere-passing tee is made up of a sphere-guiding tube having each end held within a tapering end portion of a one-piece outer tube. Each tapering end portion of the outer tube is formed thereon by forcing it into a die. The outer tube is preferably provided with the branch outlet of the tee by an extrusion process.

5 Claims, 9 Drawing Figures

METHOD OF MAKING SPHERE-PASSING TEES FOR PIPING SYSTEMS

This invention relates to sphere-passing tees, for example for use in pipe-work systems employed by the oil or gas industry.

In the oil industry, for example, a plastics sphere may be inserted into a pipeline to maintain a degree of separation between one batch of oil and a second batch fed into the pipeline immediately after the first batch, and also to provide a certain amount of cleaning as the sphere passes along the pipe-line. To prevent such a sphere from entering a branch pipe, which leads off laterally from a main run of the pipeline, the branch outlet from the main pipe run may be barred over, but there is sometimes a considerable danger that such a sphere may then "stall" in the main pipe run at the location of the branch outlet.

To reduce the danger of such stalling of a sphere in the pipeline, it is known to effect the connection of the branch line to the main pipe run by means of a structure known as a sphere-passing tee. This structure generally comprises an inner tube, for connection in the main pipe run, formed with outlet apertures intermediate its two ends, and an outer tube which surrounds the sphere-guiding tube coaxially and is welded therearound at its two ends. The outer tube is provided with a branch outlet for connection to the branch line.

Conventionally the outer tube of such a sphere-passing tee is constructed of a plurality of forged or otherwise prefabricated components by welding, the connection of the outer tube to the sphere-guiding tube being also effected by welding. Some of the welds used are subject to full pipeline pressure, thus presenting areas of potential defect. In addition, the use of a plurality of prefabricated components to form the outer tube, and the number of high quality welding processes necessary to assemble these prefabricated components together satisfactorily, tends to make such conventional sphere-passing tees rather expensive.

An embodiment of the present invention can provide a sphere-passing tee in which the sphere-guiding tube is held within the outer tube, at least at one end thereof, without the need for a weld able to withstand full pipeline pressure without leaking.

According to one aspect of the present invention there is provided a method of manufacturing a sphere-passing tee for connection in a pipe-line of a specified internal diameter, which method comprises:

subjecting a one-piece metal outer tube, of an internal diameter larger than the said specified internal diameter and provided with a branch outlet at a location intermediate the two ends of the tube, to a die forming process for reducing the diameter of a first length of said outer tube, adjacent to one end thereof, so that the said first length is made to taper towards that end and so that the internal diameter of the tube at the said one end is brought to a value smaller than the said specified internal diameter;

positioning a sphere-guiding tube, of outside diameter less than the said internal diameter of said outer tube and of internal diameter equal to the said specified internal diameter and having fluid outlet apertures intermediate its two ends, coaxially within said outer tube so that one end of said sphere-guiding tube abuts against the interior of the reduced-diameter first length of said outer tube; said sphere-guiding tube being of a length, less than that of said outer tube, such that, when the said one end of said sphere-guiding tube abuts against the said interior, the other end of said sphere-guiding tube is located adjacent to but inward of the other end of the said outer tube;

employing a die forming process to reduce the diameter of a second length of said outer tube, adjacent to the other end thereof, so that the said second length is made to taper towards that other end and so that the internal diameter of said outer tube at its said other end is brought to a value smaller than the said specified internal diameter, and so that the interior of the said second length is brought into contact with the other end of said sphere-guiding tube, whereby said outer tube and said sphere-guiding tube are fixed coaxially against movement relative to one another; and after said die forming processes, removing inner portions of said outer tube, at each end thereof, to increase the internal diameter thereof to the said specified internal diameter, and cutting a weld preparation onto each end of said outer tube.

According to a second aspect of the present invention there is provided a sphere-passing tee, for connection in a pipe-line of a specified internal diameter, comprising:

a one-piece metal outer tube having a branch outlet at a location, intermediate the two ends of the tube, at which the tube has an internal diameter larger than the said specified internal diameter;

a first length of said outer tube, adjacent to one end thereof, being reduced in diameter so that the said first length tapers towards that one end and the internal diameter of the tube at the said one end is substantially equal to the said specified internal diameter;

a sphere-guiding tube, of external diameter less than the internal diameter of said outer tube at said location and of internal diameter equal to the said specified internal diameter and having fluid outlet apertures intermedaite its two ends;

said sphere-guiding tube having one end abutting against the interior of the reduced-diameter first length of said outer tube and extending coaxially within the said outer tube from its said one end towards the other end of the outer tube to a second location that is more remote from the said first length than is the said location of the branch outlet; and said outer tube and said sphere-guiding tube being held coaxially against movement relative to one another at the said second location.

Preferably, the said branch outlet is provided by an extrusion process. Preferably also the sphere-guiding tube is shorter than the outer tube so that, with the said one end of the sphere-guiding tube abutting against the said interior, the other end of said sphere-guiding tube is positioned adjacent to but inward of the other end of the said outer tube, and a second length of said outer tube, adjacent to the other end thereof, is reduced in diameter by a die forming process so that the said second length tapers towards that other end, and so that the internal diameter of said outer tube at its said other end is brought to a value not greater than the said specified internal diameter, and so that the interior of the said second length is brought into contact with the said other end of said sphere-guiding tube; the said other end of said sphere-guiding tube can then be welded to the said interior of the reduced-diameter second length of said outer tube.

Thus a preferred embodiment of the present invention can provide a sphere-passing tee having an outer tube which is seamless, except possibly for a longitudinal welded seam produced in the original manufacture of the one-piece outer tube, and having a sphere-guiding tube which is wholly within the outer tube and is retained between die-formed reduced-diameter ends of the latter; if weld connections are provided between the ends of the sphere-guiding tube and the respective ends of the outer tube, the welds do not have to withstand the full pipe-line pressure without leaking.

The use of a die-forming process to reduce the diameters of the outer tube at its two ends, and the ensuing avoidance of full-pressure-retaining welds when a shorter-length sphere-guiding tube is thus retained completely within the outer tube, can serve to reduce manufacturing expense as compared with the prior art methods of end connection between the outer tube and the sphere-guiding tube. Avoidance of full-pressure-retaining welds can be further assisted by employing an extrusion process to form the branch outlet of the tee integrally with the outer tube.

Figure 2:
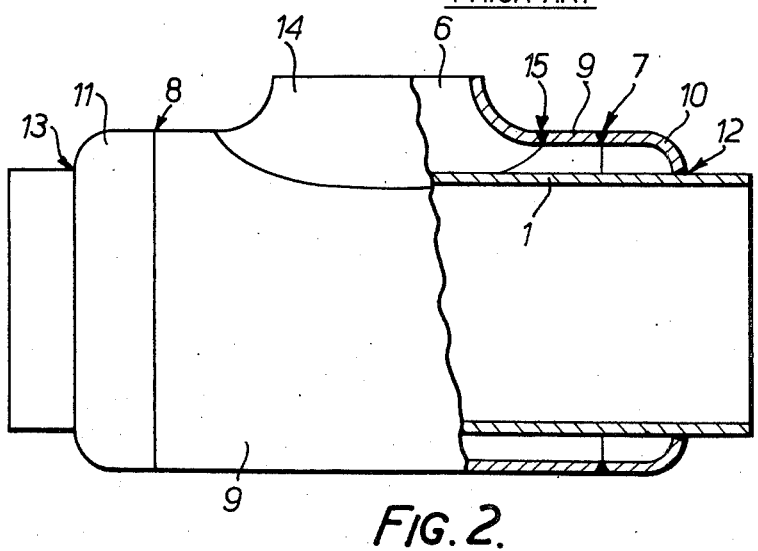
Figure 3:
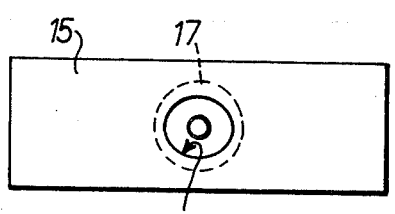
Figure 4:
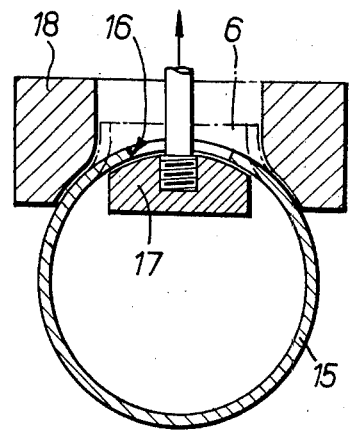
Figure 5:
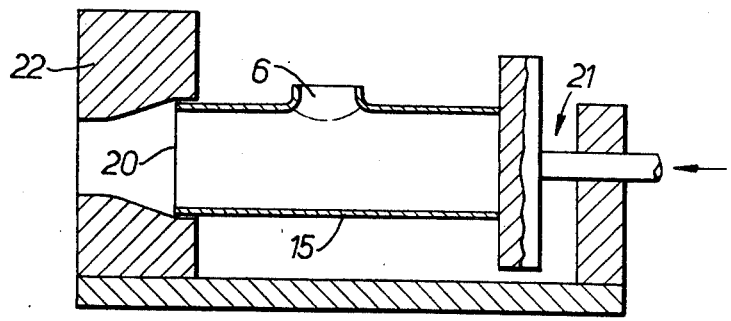
Figure 6:
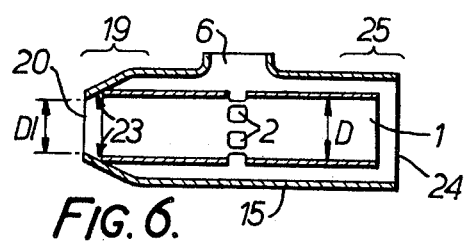
Figure 7:
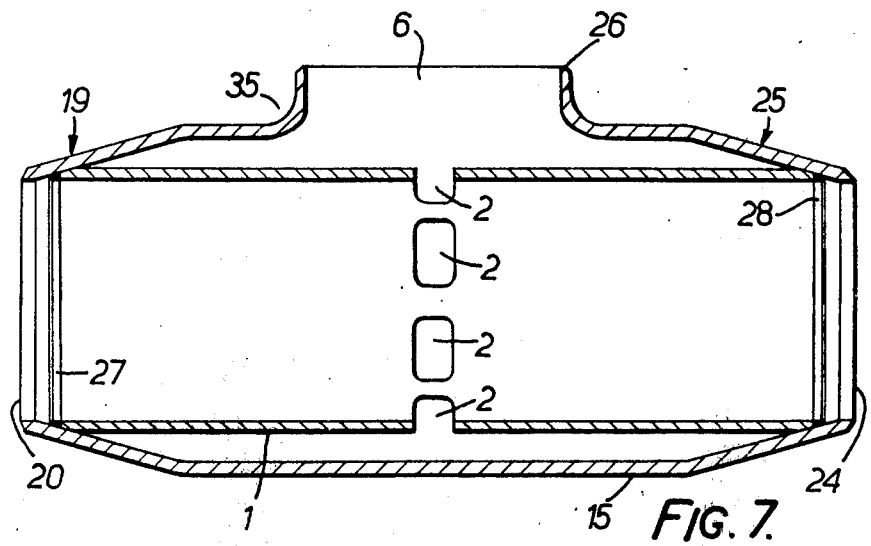
Figure 8:
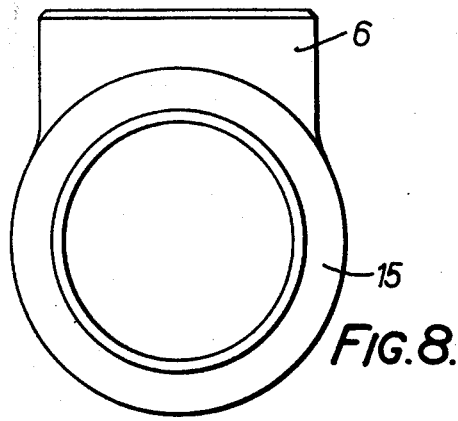
Figure 9:
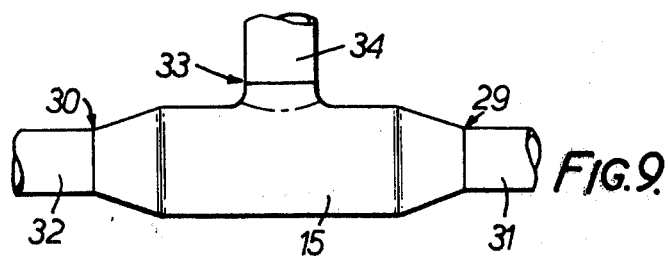

Reference will now be made, by way of example, to the accompanying diagrammatic drawings, in which:

FIG. 1 shows an axial sectional view of a previously-known form of sphere-passing tee, FIG. 2 shows a partially axially sectioned view of a second previously-known form of sphere-passing tee, FIG. 3 shows a plan view, to a smaller scale, illustrating one stage in a method of manufacturing a sphere-passing tee embodying the present invention, FIG. 4 shows a cross-sectional view, to a larger scale, of a set-up employed in a subsequent stage of the method of FIG. 3, FIG. 5 shows a smaller-scale axial sectional view of a set-up employed in a later stage of the method of FIGS. 3 and 4, FIG. 6 illustrates, by means of a smaller-scale axial sectional view, a further stage of the method of FIG. 3 to 5, FIG. 7 shows a larger-scale axial sectional view of a sphere-passing tee made by the method of FIGS. 3 to 6, FIG. 8 shows an end view of the sphere-passing tee of FIG. 7, and FIG. 9 shows a smaller-scale side view illustrating connections to the tee of FIGS. 7 and 8.

Like reference numerals are used to denote the same or directly comparable items in different Figures of the drawings.

The sphere-passing tee of FIG. 1 comprises a steel sphere-guiding tube 1 formed with intermediate outlet apertures 2 and having its opposite ends welded into respective forged steel rings 3 and 4 which are themselves welded to opposite ends of a forged steel tee component 5, possibly made by a closed die hot forging process, in the form of a tube provided with a branch outlet 6.

Butt welds 7 and 8 between the forged end-rings 3 and 4 and the respective opposite ends of the forged tee component 5 must be able to support the full pipe-line pressure without leakage, and are accordingly tested by the usual X-ray methods, and the separately forged components 3 to 5 tend to be rather expensive in themselves.

In the sphere-passing tee of FIG. 2, a steel sphere-guiding tube 1 is welded coaxially within an outer tube structure made up of a first steel tube 9 welded at 7 and 8 to respective hot-forged or spun steel end-members 10 and 11 which extend radially inwardly at the opposite ends of the outer tube structure and are sealed around the sphere-guiding tube 1 by means of fillet welds 12 and 13. The tube 9 is provided with a branch outlet 6 by cutting a lateral aperture in the tube 9 and welding thereto a forged saddle piece 14. The weld between the saddle piece 14 and the tube 9 is indicated at 15.

In this construction, all of the welds 7, 8, 12, 13 and 15 should be capable of withstanding full pipe-line pressure, and it is particularly difficult to achieve this with certainty in the case of the fillet welds 12 and 13, in view of the difficulty of X-raying such welds.

By way of example, the manufacture of a sphere-passing tee in accordance with an embodiment of the present invention is hereinafter described, with reference to FIGS. 3 to 8, particularly in relation to a sphere-passing tee designed for connection in a pipe-line for which the specified internal diameter is 28.5 inches, the outside diameter of the pipe-line being 30 inches.

One starting component for the illustrated method is a sphere-guiding tube 1 of substantially conventional form, having six slot-like apertures 2 of substantially rectangular form, each measuring 12 inches by 6 inches, distributed uniformly around the tube at its central cross-sectional plane (see FIG. 6). The number and configuration of the slots 2 may be varied in accordance with particular applications, for example in dependance upon run-to-outlet-size ratios and/or maximum pressure-drop requirements. The tube 1 has an outer diameter of 30 inches and has the specified internal diameter D of 28.5 inches.

A second starting component employed in the illustrated method is an outer tube 15 having a length of about 93 inches, somewhat longer than the tube 1, and having an outer diameter of 37.5 inches and an inner diameter of 34 inches. The tube 15 is a one-piece seamless or longitudinally welded tube, and for the purpose of the illustrated method the tube is initially in an annealed state (produced by a conventional annealing process)

The material of the tubes 1 and 15 is the steel known as ASTM A633 .Y60.

The outer tube 15, in its initial annealed state, is subjected to an extrusion process, of a kind that will be well known and readily comprehended by those skilled in this art, as illustrated in FIGS. 3 and 4 to provide the tube with a branch outlet at a location intermediate the two ends of the tube, being in this case half-way along the tube. Thus, an oval hole 16 is flame-cut in the tube 15 at the desired location, a plug-die 17 is placed in the tube 15 against the hole 16, and the plug-die is then pulled through, as illustrated in FIG. 4, so as to extrude a laterally projecting branch outlet 6 of a form, shown in broken lines in FIG. 4, restricted externally by means of a die 18. In accordance with the known art of extrusion forming, it will be appreciated that the initial thickness of the outer tube 15 is selected to be sufficient to ensure the required degree of additional strength around the crotch 35 (FIG. 7) of the branch outlet formed by the extrusion process illustrated in FIGS. 3 and 4. Such details are well known in this art, and will not require further description.

The illustrated extrusion process is accordingly a cold-forming process, but a modified form of the illustrated method could employ a hot extrusion process. In a hot extrusion process, for production of the branch outlet 6, the outer die 18 of FIG. 4 will not generally be present, and instead the tube 15 is heated in a limited area around the aperture 16. Such a process will generally give a more rounded transition between the main run of the tube 15 and the upper part of the branch outlet 6 formed in this manner, and may require the pipe 15 to be selected with a greater initial thickness in order to ensure the required strength at the region of transition.

FIG. 5 illustrates a cold die forming ("swaging") process which is employed to reduce the diameter of a first length 19 (see FIG. 6) of the tube 15, adjacent to one end 20 thereof, so that the said first length 19 is made to taper towards the end 20, and so that the internal diameter of the tube 15 at the end 20 is brought to a value D1 (FIG. 6) slightly less than the specified internal diameter of 28.5 inches. As illustrated in FIG. 5, the die-forming process is carried out by employing a hydraulic ram arrangement 21 to force the tube 15 axially towards the left so that the end 20 of the tube 15 is forced into a reducing die 22 and is thereby given the form illustrated in FIG. 6. A proprietory cold forming lubricant is used in the die 22, to assist the deformation process. Such cold die forming processes are not new in themselves, and will be readily understood, without further description, by those skilled in this art.

Other embodiments of the present invention could involve the use of a hot die forming process for this purpose.

After completion of the die forming process illustrated in FIG. 5, the aforementioned sphere-guiding tube 1 is positioned coaxially within the tube 15, as illustrated in FIG. 6, so that the left-hand end of the tube 1 as shown in FIG. 6 abuts against the interior of the reduced-diameter length 19 of the outer tube 15. The left-hand end of the tube 1 (as shown in FIG. 6) is then welded, by means of a fillet weld, to the interior of the tapering length 19 of the outer tube at the region 23 of abutment therewith. The weld seam is taken completely around the left-hand end of the tube 1 as seen in FIG. 6.

As will be seen from FIG. 6, the length of the tube 1 is such that, with its left-hand end abutting against the interior of the length 19 of the tube 15, the sphere-guiding tube 1 extends beyond the location of the branch outlet 6 to a location adjacent to but inward of the right-hand end 24 of the tube 15 as seen in FIG. 6. Completion of the manufacture of the sphere-passing tee clearly requires the coaxial fixing together of the right-hand ends of the tubes 1 and 15 as seen in FIG. 6, so as to retain the tube 1 firmly against undesirable movement in the tube 15. This is preferably done by employing once again a cold die forming process such as that illustrated in FIG. 5, this time with the tube 15 reversed so that its end 24 is forced into the die 22.

In this way, the diameter of a second length 25 (FIG. 6) of the tube 15, adjacent to the end 24 thereof, is reduced so that the length 25 is made to taper towards the end 24, and so that the internal diameter of the tube 15 at its end 24 is also brought to a value slightly smaller than the said specified internal diameter. This process brings the interior of the said second length 25 into contact with the free end of the sphere-guiding tube 1. The contacted free end of the tube 1 is then welded, again using a fillet weld, to the interior of the reduced-diameter length 25 of the outer tube at the region of contact therewith.

The provision of the fillet welds at the two ends of the sphere-guiding tube 1 can serve to smooth the internal transition between the outer tube 15 and the sphere-guiding tube 1, at the two ends of the latter, and is effected in a manner that will be well understood by those skilled in this art; after the basic production of each of these welds, the weld bead is subjected to a hand grinding operation, in conventional manner, to smooth the weld and ensure that the internal diameter of the tee at the welded region is not less than the specified value of 28.5 inches.

The above-described steps of the method of FIGS. 3 to 6 having been carried out with the tube material in an annealed state, the next step (not illustrated) is to normalise the tube material. This is done in a conventional manner, by subjecting the assembled and welded tee to a grain-refining heat treatment, in which the temperature of the structure is raised to about 900° C and maintained at that temperature for about 1 hour.

the normalised structure, after cooling, is then bored out at each of its reduced-diameter ends, to give the specified internal diameter throughout. For this purpose there is preferably employed a floating head cutter which, in well-known manner, whilst boring out the internal diameter of the tube 15 at one end simultaneously machines onto that end a standard weld preparation. This is carried out at each end of the outer tube 15, and the standard weld preparation is also machined onto the rim 26 (FIG. 7) of the branch outlet 6.

The finished sphere-passing tee is as illustrated in FIGS. 7 and 8, in which the smoothed fillet welds between the opposite ends of the sphere-guiding tube 1 and the respective interior region of the reduced-diameter end portions of the outer tube 15 are indicated at 27 and 28.

FIG. 9 shows the sphere-passing tee of FIGS. 7 and 8 connected in a pipe-line of the specified internal diameter. The two opposite ends of the outer tube 15 of the tee are butt-welded in conventional manner at 29 and 30 respectively to successive portions 31 and 32 of the pipe line, so that the sphere-guiding tube (not seen in FIG. 9) of the tee lies in a main run of the pipe-line, and the branch outlet of the tee is butt-welded in conventional manner at 33 to a branch line 34.

The tee illustrated in FIGS. 7 and 8 is designed to withstand a pipeline pressure of 1,440 p.s.i. at 38°C. As will be seen, however, the welds 27 and 28 used in the construction of this tee do not have to withstand the full pipeline pressure, so that X-ray testing of these welds is not essential.

From the preceding description, with reference to FIGS. 3 to 8, it will be appreciated that although the tooling needed in the illustrated method of production of a sphere-passing tee may be somewhat more sophisticated than that used in the production of prior art tees, once this tooling has been made available production costs thereafter should be significantly lower than is the case for prior art methods of manufacture.

Methods of manufacture substantially as hereinbefore described with reference to FIGS. 3 to 8 can be applied to the production of sphere-passing tees for connection in respective pipelines ranging in outside diameter from say 6 inches to say 54 inches, and using, for example, starting tubes made of carbon steel from ASTM A234 Grade WPB to Y65 or the like.

What is claimed is:

1. A method of manufacturing a sphere-passing tee for connection in a pipe-line of a specified internal diameter, which method comprises:

subjecting a one-piece metal outer tube, of an internal diameter larger than the said specified internal diameter and provided with a branch outlet at a location intermediate the two ends of the tube, to a die forming process for reducing the diameter of a first length of said outer tube, adjacent to one end thereof, so that the said first length is made to taper towards that end and so that the internal diameter of the tube at the said one end is brought to a value smaller than the said specified internal diameter;

positioning a sphere-guiding tube, of outside diameter less than the said internal diameter of said outer tube and of internal diameter equal to the said specified internal diameter and having fluid outlet apertures intermediate its two ends, coaxially within said outer tube so that one end of said sphere-guiding tube abuts against the interior of the reduced-diameter first length of said outer tube; said sphere-guiding tube being of a length, less than that of said outer tube, such that, when the said one end of said sphere-guiding tube abuts against the said interior, the other end of said sphere-guiding tube is located adjacent to but inward of the other end of said outer tube;

employing a die forming process to reduce the diameter of a second length of said outer tube, adjacent to the other end thereof, so that the said second length is made to taper towards that other end and so that the internal diameter of said outer tube at its said other end is brought to a value smaller than the said specified internal diameter, and so that the interior of the said second length is brought into contact with the other end of said sphere-guiding tube, whereby said outer tube and said sphere-guiding tube are fixed coaxially against movement relative to one another; and after said die forming processes, removing inner portions of said outer tube, at each end thereof, to increase the internal diameter thereof to the said specified internal diameter, and cutting a weld preparation onto each end of said outer tube.

2. A method according to claim 1, further comprising:

welding the said other end of said sphere-guiding tube to the said interior of the reduced-diameter second length of said outer tube.

3. A method according to claim 1, wherein each said die forming process is a cold forming process.

4. A method according to claim 1, further comprising:

welding the said one end of said sphere-guiding tube to the interior of the said reduced-diameter first length at the region of abutment thereagainst.

5. A method according to claim 1, wherein before the die forming processes are carried out the one-piece metal outer tube is subjected to an extrusion process for providing that tube with said branch outlet.

* * * * *